United States Patent
Sugawara

(10) Patent No.: US 10,855,856 B2
(45) Date of Patent: Dec. 1, 2020

(54) IMAGE PROCESSING APPARATUS, CONTROL METHOD, AND STORAGE MEDIUM FOR SETTING AND/OR PERFORMING A TRANSMISSION PROCESS FOR IMAGE DATA BASED ON A TRANSMISSION SETTING

(71) Applicant: CANON KABUSHIKI KAISHA, Tokyo (JP)

(72) Inventor: Kazuhiro Sugawara, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/698,310

(22) Filed: Sep. 7, 2017

(65) Prior Publication Data
US 2018/0077304 A1 Mar. 15, 2018

(30) Foreign Application Priority Data
Sep. 14, 2016 (JP) ................... 2016-179533

(51) Int. Cl.
*H04N 1/00* (2006.01)
(52) U.S. Cl.
CPC ..... *H04N 1/00472* (2013.01); *H04N 1/00427* (2013.01); *H04N 1/00474* (2013.01); *H04N 1/00973* (2013.01)
(58) Field of Classification Search
USPC ................................. 358/1.1–3.29
See application file for complete search history.

(56) References Cited

U.S. PATENT DOCUMENTS

| 9,883,057 B2* | 1/2018 | Kirihara | H04N 1/00514 |
| 2007/0165268 A1 | 7/2007 | Sodeura et al. | |
| 2010/0182638 A1* | 7/2010 | Kimura | G06F 3/1204 358/1.15 |
| 2013/0003113 A1 | 1/2013 | Yamada | |
| 2013/0003114 A1 | 1/2013 | Maehira | |
| 2013/0329250 A1* | 12/2013 | Takamiya | H04N 1/00389 358/1.15 |
| 2014/0168694 A1* | 6/2014 | Hiruma | H04N 1/00206 358/1.15 |
| 2014/0320886 A1* | 10/2014 | Uchikawa | H04N 1/4433 358/1.14 |

(Continued)

FOREIGN PATENT DOCUMENTS

| JP | 2013-211922 A | 10/2013 |
| JP | 2016-005165 A | 1/2016 |
| JP | 2016-21614 A | 2/2016 |

*Primary Examiner* — Marcellus J Augustin
(74) *Attorney, Agent, or Firm* — Canon U.S.A., Inc. IP Division

(57) ABSTRACT

One or more embodiments of an image processing apparatus, control method and storage mediums for use therewith are provided herein. At least one embodiment of an image processing apparatus receives setting information related to a transmission of an image from an external apparatus, sets whether to display a confirmation screen related to the setting information on an operation unit, and controls to differentiate whether or not the confirmation screen related to the setting information is displayed on the operation unit after the setting information is received in accordance with whether or not the setting of displaying the confirmation screen is performed.

13 Claims, 15 Drawing Sheets

(56) References Cited

U.S. PATENT DOCUMENTS

| | | | |
|---|---|---|---|
| 2015/0089097 A1* | 3/2015 | Isoda | G06F 3/0613 710/58 |
| 2015/0138598 A1 | 5/2015 | Yamamichi | |
| 2016/0173730 A1 | 6/2016 | Kasuya | |
| 2016/0255213 A1* | 9/2016 | Okazawa | H04N 1/00106 358/1.15 |
| 2016/0277595 A1 | 9/2016 | Kodaira et al. | |
| 2018/0084120 A1 | 3/2018 | Maruyama | |

* cited by examiner

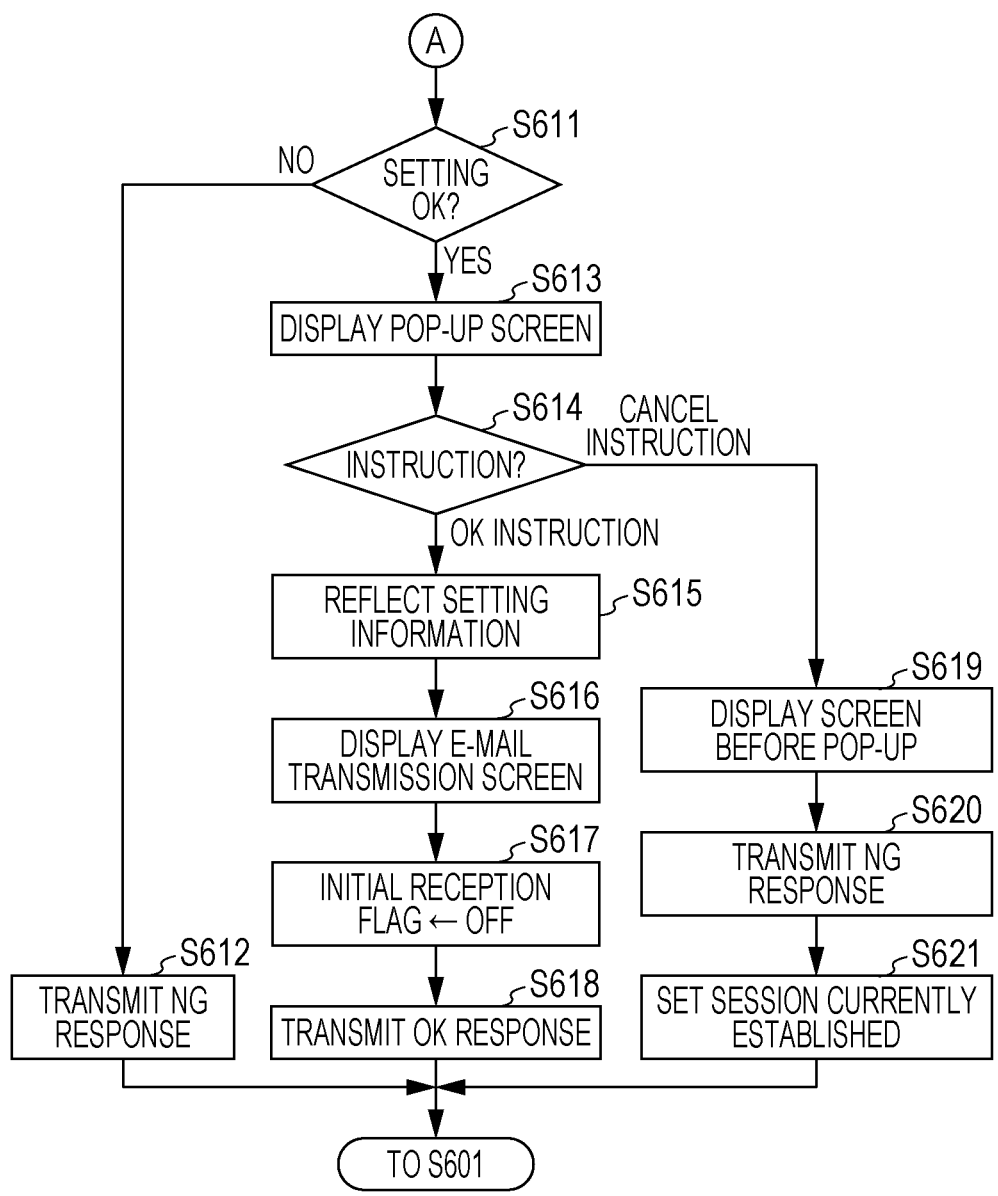

FIG. 10

```
┌─────────────────────────────────────┐
│ ⤺ E-MAIL                       │─1001
│ To: SPECIFY ADDRESS  │ ADDRESS CHECK │
│                      │     1 ADDRESS │
│ ADDRESS SETTING│TRANSMISSION SETTING│
│                      │  ⟲  RESET    │
│ ⌨ KEYBOARD INPUT    │              │
│ 📖 ADDRESS BOOK     │ ◇ BLACK-AND- │
│ 🗄 LDAP SERVER      │   WHITE START│
│ 🕒 TRANSMISSION HISTORY│◇ COLOR START│
│                      │◆ STATUS CHECK│
└─────────────────────────────────────┘
```

⬇ SECOND SETTING INFORMATION IS RECEIVED FROM THE SAME MOBILE TERMINAL APPARATUS

```
┌─────────────────────────────────────┐
│ ⤺ E-MAIL                            │
│ ┌─────────────────────────────┐     │
│ │  SETTING IS RECEIVED        │     │─1002
│ │  FROM MOBILE TERMINAL.      │     │
│ │  CONFIRM THE FOLLOWING      │     │
│ │  SETTINGS.                  │     │
│ │   - ADDRESS                 │     │
│ │   - TITLE / BODY TEXT       │     │
│ │          ┌────┐             │     │
│ │          │ OK │─1003        │     │
│ │          └────┘             │     │
│ └─────────────────────────────┘     │
│                      │◇ STATUS CHECK│
└─────────────────────────────────────┘
```

⬇ SET SECOND ADDRESS

```
┌─────────────────────────────────────┐
│ ⤺ E-MAIL                            │
│ To: SPECIFY ADDRESS  │ADDRESS CHECK │─1004
│                      │  2 ADDRESSES │
│ ADDRESS SETTING│TRANSMISSION SETTING│
│                      │  ⟲  RESET    │
│ ⌨ KEYBOARD INPUT    │              │
│ 📖 ADDRESS BOOK     │◇ BLACK-AND-  │
│ 🗄 LDAP SERVER      │  WHITE START │
│ 🕒 TRANSMISSION HISTORY│◇ COLOR START│
│                      │◆ STATUS CHECK│
└─────────────────────────────────────┘
```

┌──────────────┐
│ADDRESS CHECK │ ⬇
└──────────────┘

```
┌─────────────────────────────────────┐
│ ⤺ E-MAIL                       │─1006
│ To: email_address@example.com  │─408
│ Cc: email_address2@example.com │─1005
│ Bcc:                           │
│                                │
│                                │
│                                │
│                  ◆ STATUS CHECK│
└─────────────────────────────────────┘
```

FIG. 12

IMAGE PROCESSING APPARATUS, CONTROL METHOD, AND STORAGE MEDIUM FOR SETTING AND/OR PERFORMING A TRANSMISSION PROCESS FOR IMAGE DATA BASED ON A TRANSMISSION SETTING

BACKGROUND OF THE INVENTION

Field of the Invention

The present disclosure relates to one or more embodiments of an image processing apparatus that performs a setting related to a transmission of image data on the basis of setting information transmitted from a terminal apparatus, and the disclosure also relates to one or more embodiments of a control method, and one or more embodiments of a program and/or storage medium.

Description of the Related Art

Up to now, image processing apparatuses provided with a plurality of functions such as a scan function, a print function, a copy function, and a transmission function of image data have been proposed. In a case where image data is transmitted by using these image processing apparatuses, an address of a transmission destination can be specified when an address registered in an address book of the image processing apparatus is selected or an address is directly input on an operation panel. In addition, demands for also utilizing data in a mobile terminal for business have been increased, and a function for coordinating the image processing apparatus with the mobile terminal has been proposed (a function described in Japanese Patent Laid-Open No. 2016-21614).

SUMMARY OF THE INVENTION

In view of the above, at least one embodiment of an image processing apparatus according to at least one aspect of the present disclosure includes: an operation unit; and at least one processor, wherein the at least one processor acts as the following units: a reception unit configured to receive setting information related to a transmission of an image from an external apparatus; a setting unit configured to set whether to display a confirmation screen related to the setting information on the operation unit; and a control unit configured to control to differentiate whether or not the confirmation screen related to the setting information is displayed on the operation unit after the setting information is received in accordance with whether or not the setting unit performs the setting for displaying the confirmation screen.

According to other aspects of the present disclosure, one or more additional image processing apparatuses, one or more control methods, and one or more storage mediums for use therewith are discussed herein. Further features of the present disclosure will become apparent from the following description of exemplary embodiments with reference to the attached drawings.

BRIEF DESCRIPTION OF THE DRAWINGS

FIGS. 6A and 6B are flow charts illustrating an example of processing executed by the MFP.

FIG. 10 illustrates an example of the screen displayed on the touch panel.

FIG. 12 illustrates an example of the screen displayed on the touch panel.

DESCRIPTION OF THE EMBODIMENTS

Hereinafter, exemplary embodiments of the present disclosure will be described with reference to the drawings.

It is supposed that an image processing apparatus is shared and used by a plurality of users. For example, a case is considerable where, while one user is operating an operation unit in a main body of the image processing apparatus to set an address, another user different from the user who operates the operation unit transmits address information from a mobile terminal. In this case, when the user of the mobile terminal transmits the address information, the address information that is irrelevant to the user who is currently using the image processing apparatus is displayed, and the operation by the user of the image processing apparatus is disturbed. According to the present exemplary embodiment, a mechanism is provided for improving usability for the user in a case where setting information is received from the terminal apparatus.

Figure 1:
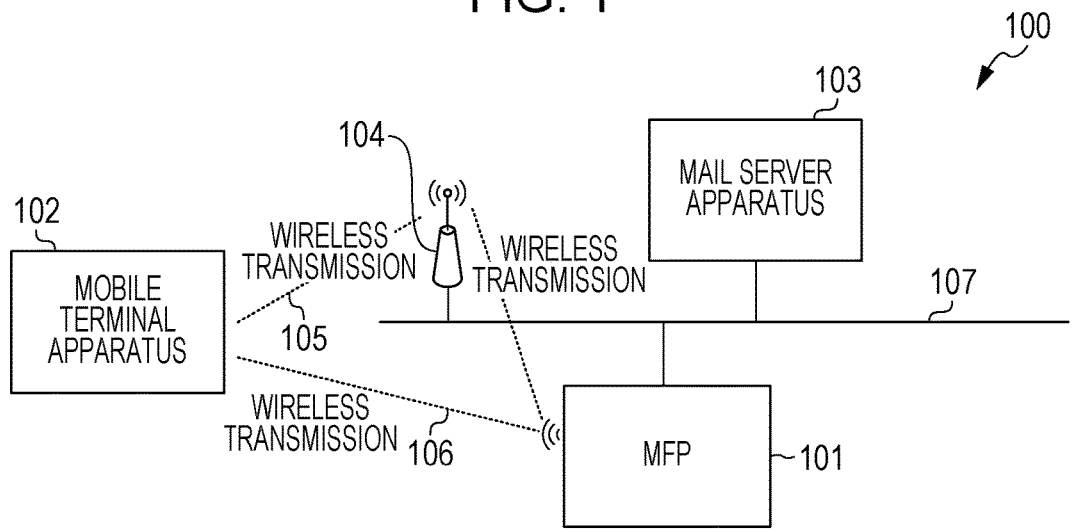
FIG. 1 illustrates an example of at least one embodiment of an image processing system.

FIG. 1 is an overall view of an image processing system 100 according to a first exemplary embodiment. A multifunction peripheral (MFP) 101, a mail server apparatus 103, and an access point 104 are connected to one another so as to be mutually communicable on a network 107.

Furthermore, a mobile terminal apparatus 102 is connected to the access point 104 using wireless transmission 105 and is connected to the mail server apparatus 103 and the MFP 101 via the network 107 so as to be mutually communicable. It should be noted that the MFP 101 is also provided with a wireless function and can be directly connected to the mobile terminal apparatus 102 and the access point 104 using wireless transmission 106. To transmit image data of a scanned document as an attached file of an electronic mail (e-mail), the MFP 101 specifies an e-mail address at a sending destination as a transmission destination and sends (transmits) the e-mail to the mail server apparatus 103. The MFP 101 is an example of the image processing apparatus. The mail server apparatus 103 stores the received e-mail in a mail box provided in a storage (not illustrated) or further transfers the e-mail to an external mail server. The user operates an operation unit 116 of the MFP 101 which will be described below to input necessary pieces of setting information for the MFP 101 to transmit the image data (including at least one of a transmission destination, a title of the e-mail, a body text of the e-mail, and a file name of the image data to be transmitted, for example). The user can also input these pieces of setting information by operating the mobile terminal apparatus 102 corresponding to an external apparatus of the MFP 101. The mobile terminal apparatus 102 transmits the setting information to the MFP 101. The MFP 101 receives the setting information transmitted from the mobile terminal apparatus 102 to be used as the setting for transmitting the image data.

Figure 2:
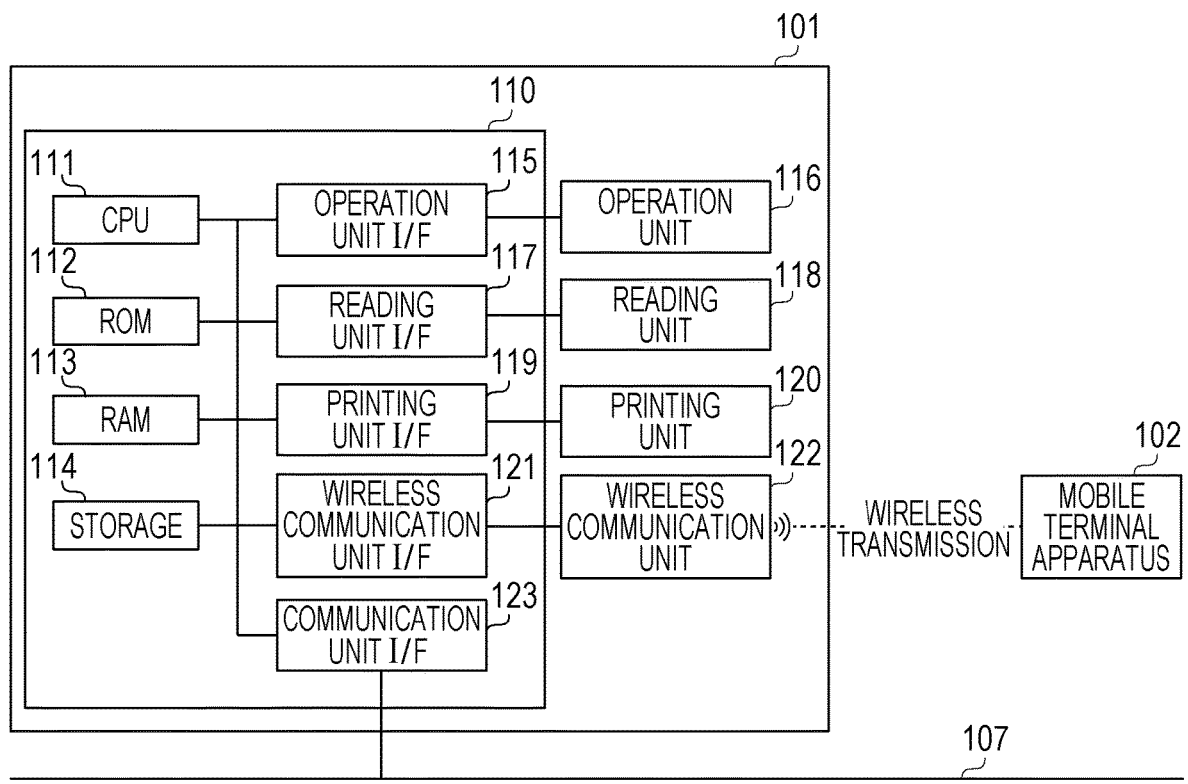
FIG. 2 illustrates an example of a configuration of at least one embodiment of a multifunction peripheral (MFP).

FIG. 2 illustrates a configuration of the MFP 101. A control unit 110 including a CPU 111 controls an operation of the entirety of the MFP 101. The CPU 111 reads out a control program stored in a ROM 112 or a storage 114 to perform various controls such as reading control and printing control. The ROM 112 stores the control program that can be executed by the CPU 111. The ROM 112 also stores a boot program, font data, and the like. A RAM 113 is a main memory of the CPU 111 and is used as a temporary storage area for developing various the control programs stored in a work area, the ROM 112, and the storage 114. The storage 114 stores the image data, print data, various programs, and various pieces of setting information. According to the present exemplary embodiment, it is supposed that a flash memory is used as the storage 114, but an auxiliary storage device may be used instead. Examples of the auxiliary storage device include a solid state drive (SSD), a hard disk drive (HDD), an embedded multi media card (eMMC), and the like. Functions and processing of the MFP 101 which will be described below are realized when the CPU 111 reads out the program stored in the ROM 112 or the storage 114 and executes this program.

It should be noted that the single CPU 111 executes respective processings illustrated in the flow charts which will be described below by using the single memory (the RAM 113) in the MFP 101 according to the present exemplary embodiment, but another mode may also be adopted. For example, the MFP 101 includes a plurality of CPUs, RAMs, ROMs, and storages and can also execute the respective processings illustrated in the flow charts which will be described below while these memories are caused to be coordinated with one another. Moreover, part of the processings may be executed by using a hardware circuit such as an application specific integrated circuit (ASIC) or a field-programmable gate array (FPGA).

An operation unit interface (I/F) 115 connects the operation unit 116 to the control unit 110. The operation unit 116 displays information for the user and detects an input from the user. A reading unit I/F 117 connects a reading unit 118 to the control unit 110. The reading unit 118 reads an image on the document and converts the image into image data such as binary data. The image data generated by the reading unit 118 is transmitted to the external apparatus or printed on a recording sheet.

A printing unit I/F 119 connects a printing unit 120 to the control unit 110. The CPU 111 transfers the image data (printing target image data) stored in the RAM 113 to the printing unit 120 via the printing unit I/F 119. The printing unit 120 prints the transferred image data on a recording sheet fed from a feeding cassette.

A communication unit I/F 123 connects the control unit 110 to the network 107. The communication unit I/F 123 transmits the image data and various information of the inside of the apparatus to the external apparatus on the network 107 and receives the print data and various information from an information processing apparatus on the network 107. As a method for the transmission and reception via the network, the transmission and reception using the e-mail described above and file transmission using the other protocols (for example, FTP, SMB, WEBDAV, or the like) can be performed. A wireless communication unit I/F 121 is an interface configured to control a wireless communication unit 122 and connects the control unit 110 to an external wireless device (herein, the mobile terminal apparatus 102) via the wireless transmission 106.

Figure 3:
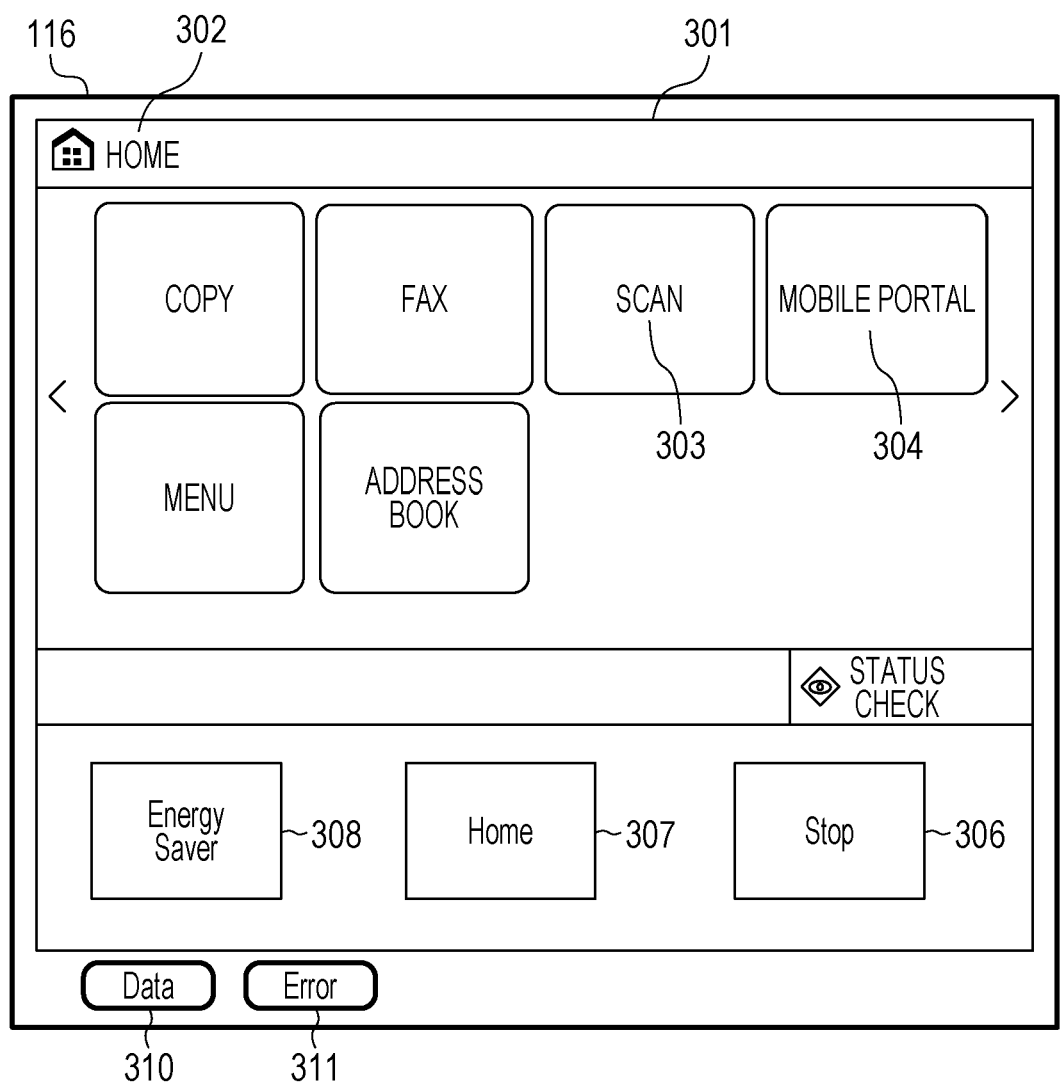
FIG. 3 is an external appearance view illustrating an example of an operation unit.

FIG. 3 is an external appearance view illustrating the operation unit 116. The operation unit 116 includes a touch panel 301 that displays an operation screen and LEDs 310 and 311. The touch panel 301 also functions as an acceptance unit configured to accept an instruction (touch, drag, flick, or the like) from the user. The user directly touches respective images (touch images) displayed on the touch panel 301 by an object such as a finger or a stylus and instructs executions of respective functions based on the displayed images. Herein, the touch image refers to an image for executing controller control associated with a displayed area when a segmented area where the image is displayed is touched.

A home screen is displayed on the touch panel 301 illustrated in FIG. 3, and a title 302 indicating the home screen is displayed. The home screen is a screen for selecting respective functions executed by the MFP 101 such as copy, facsimile (fax) transmission, scan, mobile portal, menu, and address.

A scan button 303 is a touch image for displaying a scan selection screen (not illustrated) from the MFP 101. Selection display of a transmission unit such as e-mail transmission, SMB, file transmission based on FTP, internet fax (I-fax) transmission is performed on the scan selection screen. Furthermore, respective transmission setting screens are displayed when the displayed selection displays are touched. A mobile portal button 304 is a touch image for displaying a mobile portal screen on which various pieces of setting information for connecting the MFP 101 to the mobile terminal apparatus 102 are displayed for the user. The mobile portal screen displays various pieces of setting information (SSID/PIN code or the like) for a direct connection where the MFP 101 is directly connected to the mobile terminal apparatus 102 or a LAN connection where the MFP 101 is connected to the mobile terminal apparatus 102 via a LAN.

A stop button 306 is a touch image for executing cancellations of various operations and is a resident button regularly displayed on the operation unit 116. A home button 307 is a touch image for displaying the home screen and is a resident button regularly displayed on the operation unit 116. An energy saver (ES) button 308 is a touch image for transition to a sleep state and is a resident button regularly displayed on the operation unit 116.

The LEDs 310 and 311 notify the user of a state of the MFP 101. The LED 310 turns on when an e-mail or a print job is received or executed, and the LED 311 turns on when any error occurs in the MFP 101.

Figure 4:
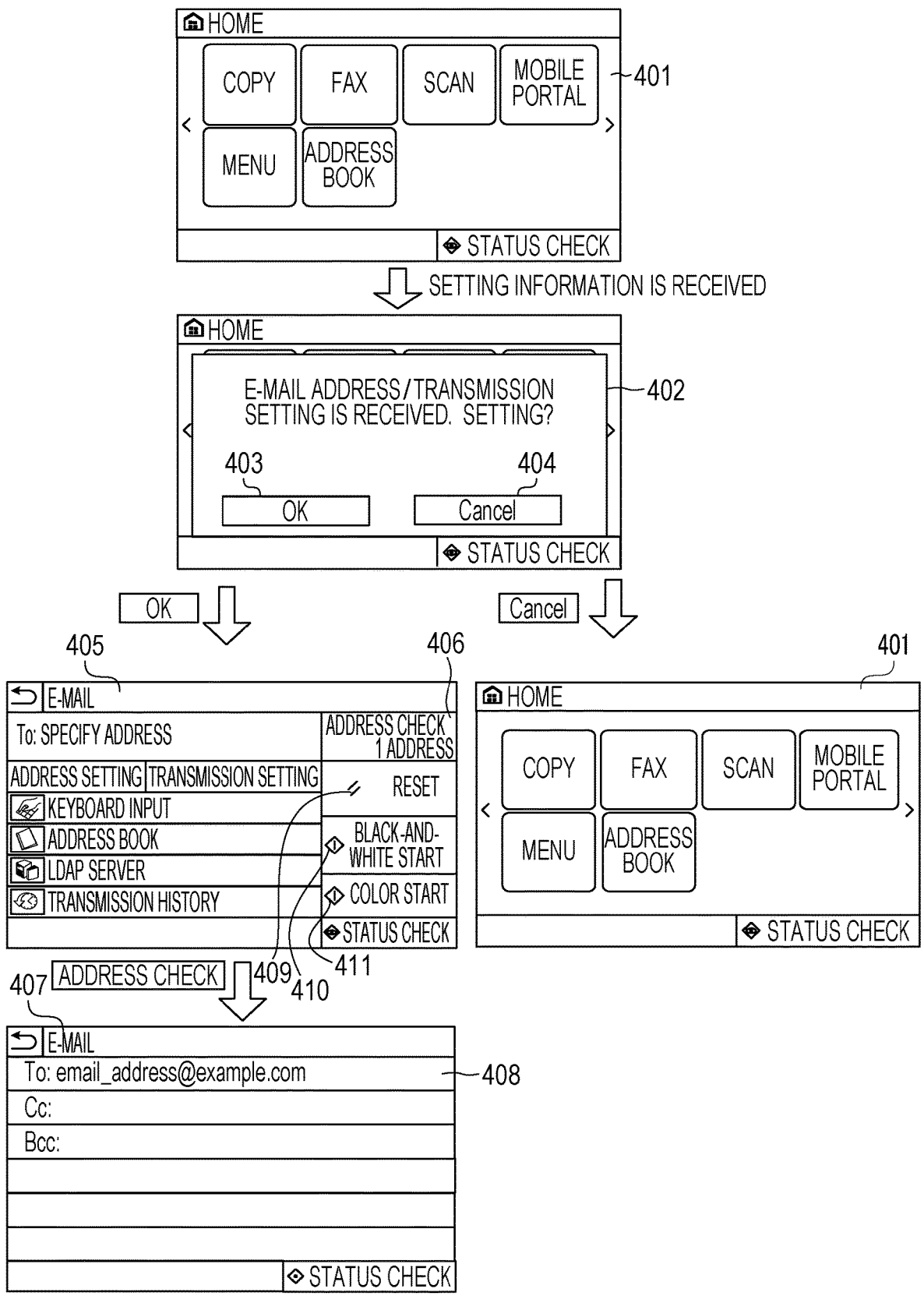
FIG. 4 illustrates an example of a screen displayed on a touch panel.

FIG. 4 is a screen transition view of the touch panel 301 when data of the transmission destination of the e-mail is received as the setting information from the mobile terminal apparatus 102. FIG. 4 illustrates a home screen 401. The home screen 401 is a screen on which the setting information from the mobile terminal apparatus 102 can be received which will be described below. Herein, the setting information is information related to the transmission setting of the image and the e-mail.

When the CPU 111 receives the setting information from the mobile terminal apparatus 102 on the home screen 401 and determines that the content of the setting information is correct, the CPU 111 performs control so as to display a pop-up screen 402 (display processing). Herein, the pop-up screen 402 is a screen superposing the home screen 401, and an operation with respect to the screen superposed by the pop-up screen is guarded. At the time of the display of the pop-up screen 402, the CPU 111 prohibits a status check of the home screen 401 by the user and operations with respect to various functions. The pop-up screen 402 is a display screen for notifying the user that the setting information such as the e-mail address or the transmission setting is received via the wireless transmission 106 or the network 107 by the mobile terminal apparatus 102. The pop-up screen 402 is also a confirmation screen for the user to confirm whether or not the setting corresponding to the setting information is performed.

An OK button 403 and a cancel button 404 are displayed on the pop-up screen 402 as buttons for closing the pop-up screen 402. When the OK button 403 is pressed, the CPU 111 accepts an OK instruction indicating that the setting in accordance with the received setting information is performed. Subsequently, the CPU 111 performs transition of the display to an e-mail transmission screen 405 in accordance with the OK instruction and controls so as to perform the setting related to the transmission of the image or the like on the basis of the received setting information. When the cancel button 404 is pressed, the CPU 111 accepts a cancel instruction indicating that the setting in accordance with the received setting information is not performed. Subsequently, the CPU 111 discards the received setting information in accordance with the cancel instruction and returns the display to the home screen 401. That is, in a case where the cancel instruction is accepted, the CPU 111 controls so as not to perform the setting in accordance with the received setting information. It should be noted that the OK button 403 and the cancel button 404 are respectively examples of a selection image for inputting the instruction indicating that the setting in accordance with the setting information is performed and a selection image for inputting the instruction indicating that the setting in accordance with the setting information is not performed. It should be noted that a state in which the cancellation is performed may be transmitted to the mobile terminal apparatus 102 in a case where the cancel button 404 is pressed.

It should be noted that the content of the setting information received from the mobile terminal apparatus 102 (e-mail address, file name, body text, title, and the like) may be displayed on the pop-up screen 402. In addition, a check button for checking a detail of the setting information may be displayed on the pop-up screen 402. In this case, when the check button is pressed, the CPU 111 displays the content of the setting information received from the mobile terminal apparatus 102 on a detailed display screen. The content of the setting information includes various settings specified at the time of the e-mail transmission such as the e-mail address corresponding to the destination of the e-mail, the title of the e-mail, the body text, and the file name of the attached image file. The e-mail address is set via an address book of the mobile terminal apparatus 102 or a direct input by using an application on the mobile terminal apparatus 102.

The e-mail transmission screen 405 is a setting screen for transmitting the e-mail. In FIG. 4, one is displayed as the number of addresses in an address check button 406 as an example in which one mail address is received. In a case where a plurality of addresses are received, the number of received addresses is displayed as the number of addresses in the address check button 406. When the address check button is pressed, the CPU 111 displays an address confirmation screen 407. It should be noted that, in a case where a reset button 409 is pressed on the e-mail transmission screen 405, the CPU 111 clears the set information. At this time, the CPU 111 clears the received setting information and also resets the communication with the mobile terminal apparatus 102 corresponding to the transmission source. In addition, a case is considered where a black-and-white start button 410 or a color start button 411 is pressed on the e-mail transmission screen 405. In this case, the CPU 111 causes the reading unit 118 to scan the document and generate the image data. The CPU 111 attaches the generated image data to the e-mail and sends the e-mail. In this case too, the CPU 111 clears the received setting information and also resets the communication with the mobile terminal apparatus 102 corresponding to the transmission source.

Herein, a method of resetting the communication between the MFP 101 and the mobile terminal apparatus 102 will be described. The MFP 101 performs the communication with the mobile terminal apparatus 102 on the basis of an HTTP protocol and manages a connection state by using a session ID based on the HTTP protocol. The session ID is an ID transmitted to a terminal side on the basis of the HTTP communication protocol and is a unique ID for identifying the mobile terminal apparatus 102. The MFP 101 generates and transmits the session ID to the mobile terminal apparatus 102 that has established the session and further saves the session ID in the RAM 113. The mobile terminal apparatus 102 is connected to the MFP 101 by using the session ID received at the time of the connection request. The MFP 101 according to the present exemplary embodiment limits the number of established sessions with the mobile terminals on the basis of the HTTP protocol to one. In a case where the session ID saved in the RAM 113 is the same as the session ID of the mobile terminal apparatus 102 that has established the session, the MFP 101 determines that the mobile terminal apparatus 102 is the mobile terminal apparatus 102 that currently establishes the session. On the other hand, in a case where the session IDs are different from each other, the MFP 101 determines that the mobile terminal apparatus 102 is not the mobile terminal apparatus 102 that currently establishes the session and rejects the establishment of a session different from the currently established session ID.

The reset of the communication with the mobile terminal apparatus 102 by the MFP 101 means that the session ID saved in the RAM 113 is deleted and transition of the state is performed to a state in which no communication is currently established with any of the mobile terminal apparatuses 102. When the transition to this state is performed, the MFP 101 can accept a new connection request.

Figure 5A:
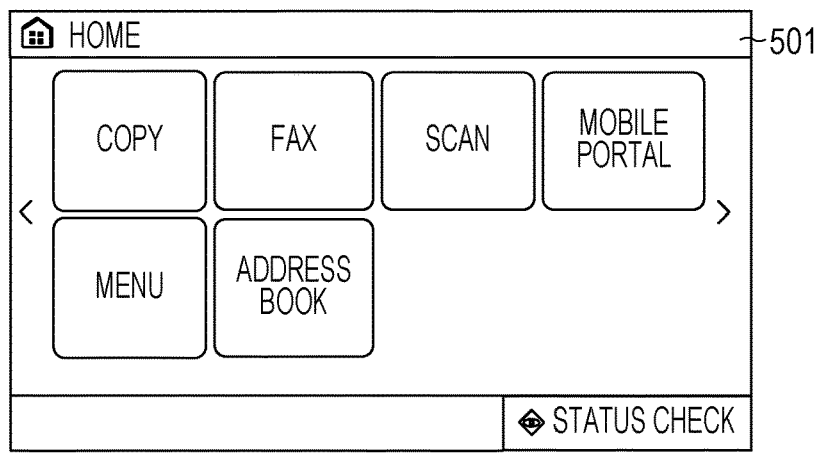
FIGS. 5A to 5C illustrate examples of a reception acceptable screen.
Figure 5B:
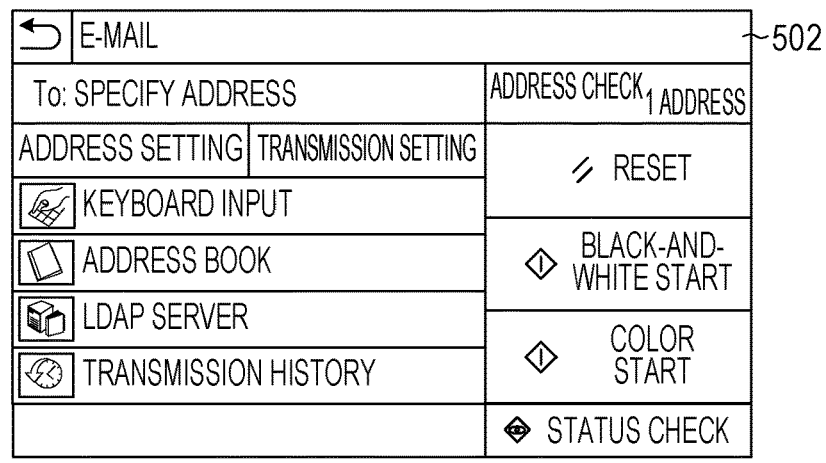
Figure 5C:
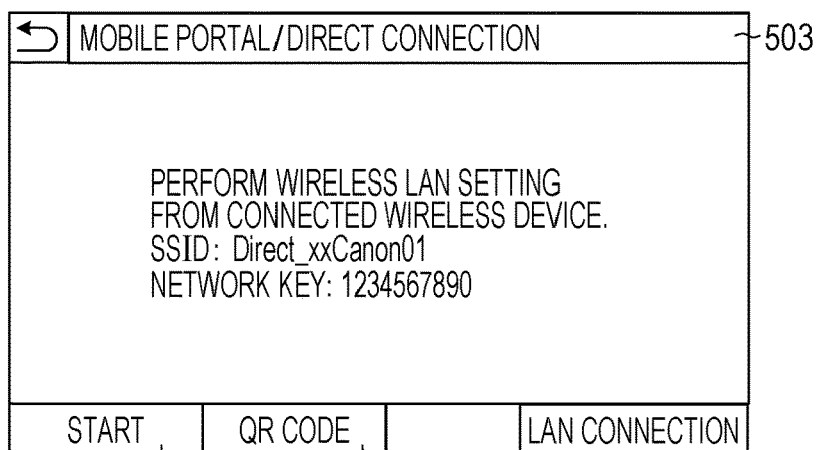

FIGS. 5A to 5C illustrate examples of a reception acceptable screen for accepting a reception of the setting information from the mobile terminal apparatus 102. In the MFP 101 according to the present exemplary embodiment, the home screen 501 illustrated in FIG. 5A, an e-mail transmission screen 502 illustrated in FIG. 5B, and the mobile portal screen 503 illustrated in FIG. 5C are previously set as the reception acceptable screens. In a case where the connection request from the mobile terminal apparatus 102 is received when the operation unit 116 displays the reception acceptable screen, the MFP 101 permits the connection and accepts the setting information transmitted from the mobile terminal apparatus 102. On the other hand, in a case where the operation unit 116 displays a screen other than the reception acceptable screen, the MFP 101 rejects the connection request from the mobile terminal apparatus 102. For this reason, no interruption of the operation by the pop-up screen 402 occurs at the time of the display of screen other than the reception acceptable screen for the user who currently operates the MFP 101. Herein, the reception acceptable screen is an example of a particular screen previously set in the MFP 101.

The home screen 501 is a default standby screen of the MFP 101. The e-mail transmission screen 502 is a screen displayed when the e-mail transmission is performed. When the MFP 101 receives the setting information from the mobile terminal apparatus 102, first, the pop-up screen 402 is displayed. Thereafter, when the OK button 403 is pressed, the e-mail transmission screen 502 in a state in which the received setting information is set is displayed. It should be noted that the MFP 101 additionally sets the transmission destination of the e-mail in a case where the e-mail address is received at the time of the reception of the setting information, and the information is set by overwriting in a case where the setting information such as the title, the body text, or the file name is received.

The mobile portal screen 503 is a setting screen for establishing a wireless communication between the mobile terminal apparatus 102 and the MFP 101. The user sets an SSID and a network key displayed on the mobile portal screen 503 on the mobile terminal apparatus 102 side and presses a start button 504. As a result, the wireless communication based on a direct connection is started. In a case where a QR code (registered trademark) button 505 is pressed, the MFP 101 displays a wireless communication setting by using a QR code. When the mobile terminal apparatus 102 captures the QR code, the start of the wireless communication can be executed. After the establishment of the wireless communication, the transmission operation of the setting information such as the e-mail address, the title of the e-mail, or the body text is performed by the mobile terminal apparatus 102. Thereafter, the MFP 101 displays the pop-up screen 402 illustrated in FIG. 4 and reflects the received setting information onto the e-mail transmission screen 502 after the press of the OK button 403.

Figure 6A:
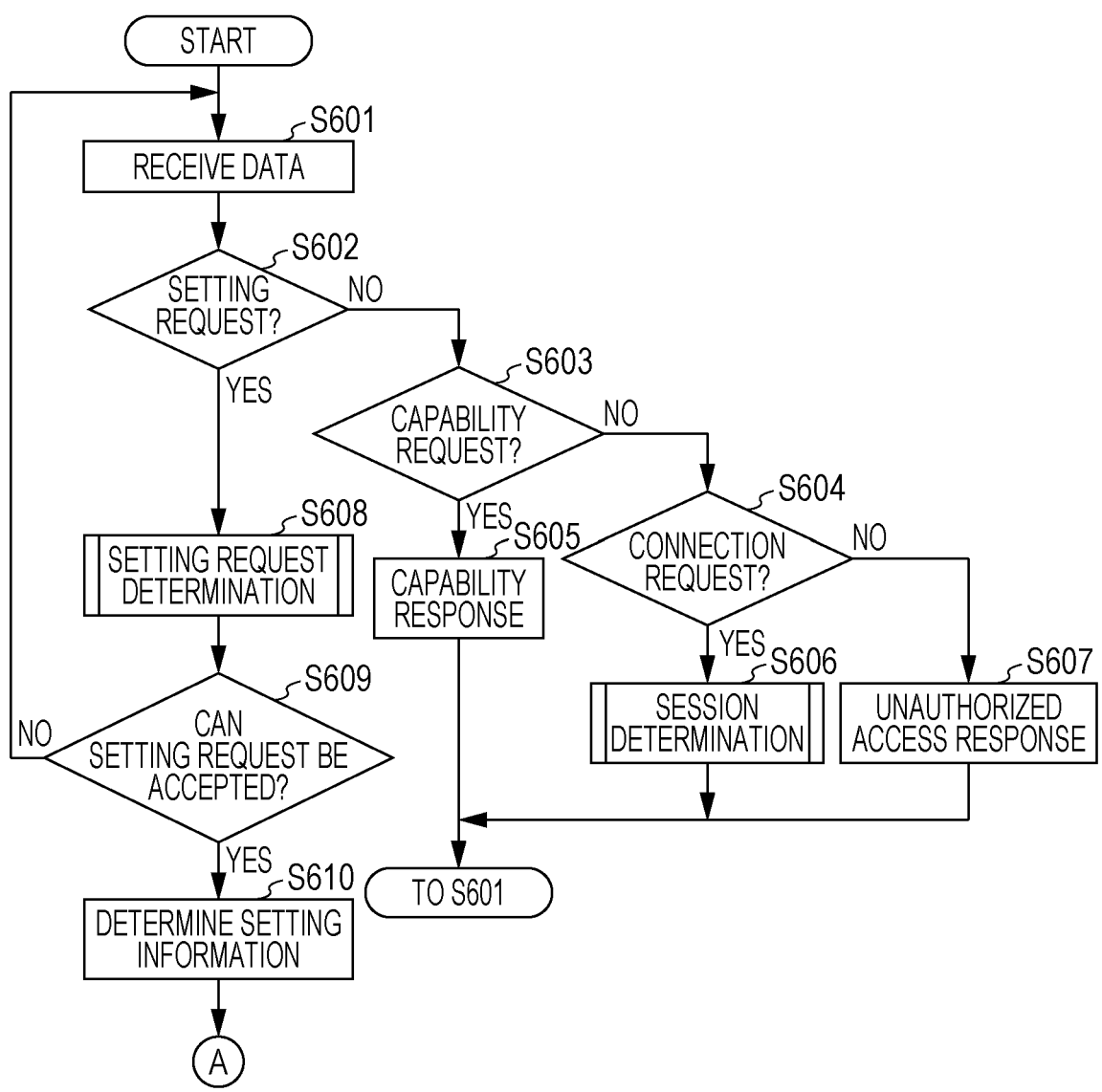

FIGS. 6A and 6B are flow charts illustrating processing executed by the MFP 101. The processing illustrated by the flow charts of FIGS. 6A and 6B is executed while the CPU 111 reads out the control program stored in the ROM 112 or the storage 114 onto the RAM 113. The CPU 111 monitors the data reception from the communication unit I/F 123 or the wireless communication unit I/F 121 by a network packet reception unit. In S601, the CPU 111 receives the data transmitted from the mobile terminal apparatus 102 via the network 107 or the wireless transmission 106. Next, in S602, the CPU 111 determines whether or not the received data is a setting request. It should be noted that the setting request includes the setting information. In a case where the received data is the setting request (S602: YES), the CPU 111 advances the processing to S608. In a case where the received data is not the setting request (S602: NO), the CPU 111 advances the processing to S603.

In S603, the CPU 111 determines whether or not the received data is a capability request. In a case where the received data is the capability request (S603: YES), the CPU 111 advances the processing to S605. In a case where the received data is not the capability request (S603: NO), the CPU 111 advances the processing to S604. In S604, the CPU 111 determines whether or not the received data is the connection request. In a case where the received data is the connection request (S604: YES), the CPU 111 advances the processing to S606. In a case where the received data is not the connection request (S604: NO), the CPU 111 advances the processing to S607.

In S605, the CPU 111 transmits a capability response to the mobile terminal apparatus 102 and thereafter advances the processing to S601. The capability response is data indicating the content of the setting information that can be received by the MFP 101. The setting information that can be received by the MFP 101 according to the present exemplary embodiment is data set on the e-mail transmission screen. The setting information includes the e-mail address as the transmission destination, specification of To/Cc/Bcc of the e-mail address, the file name of the transmitted file, the title of the e-mail, the body text of the e-mail, and the like. The MFP 101 notifies the mobile terminal apparatus 102 of the content of the data that can be received by its own apparatus in the capability response. In S607, the CPU 111 transmits an authorized access response indicating that the request from the mobile terminal apparatus 102 is authorized to the mobile terminal apparatus 102 and thereafter advances the processing to S601.

In S606, the CPU 111 performs session determination processing and thereafter advances the processing to S601. In a case where a session is established, the session ID is assigned to the mobile terminal apparatus 102 as the mobile terminal apparatus 102 that currently establishes the session. Subsequently, the mobile terminal apparatus 102 receives the session ID from the MFP 101. The session ID is cleared by the press of the black-and-white start button 410, the color start button 411, the home button 307, or the reset button 409.

Figure 7:
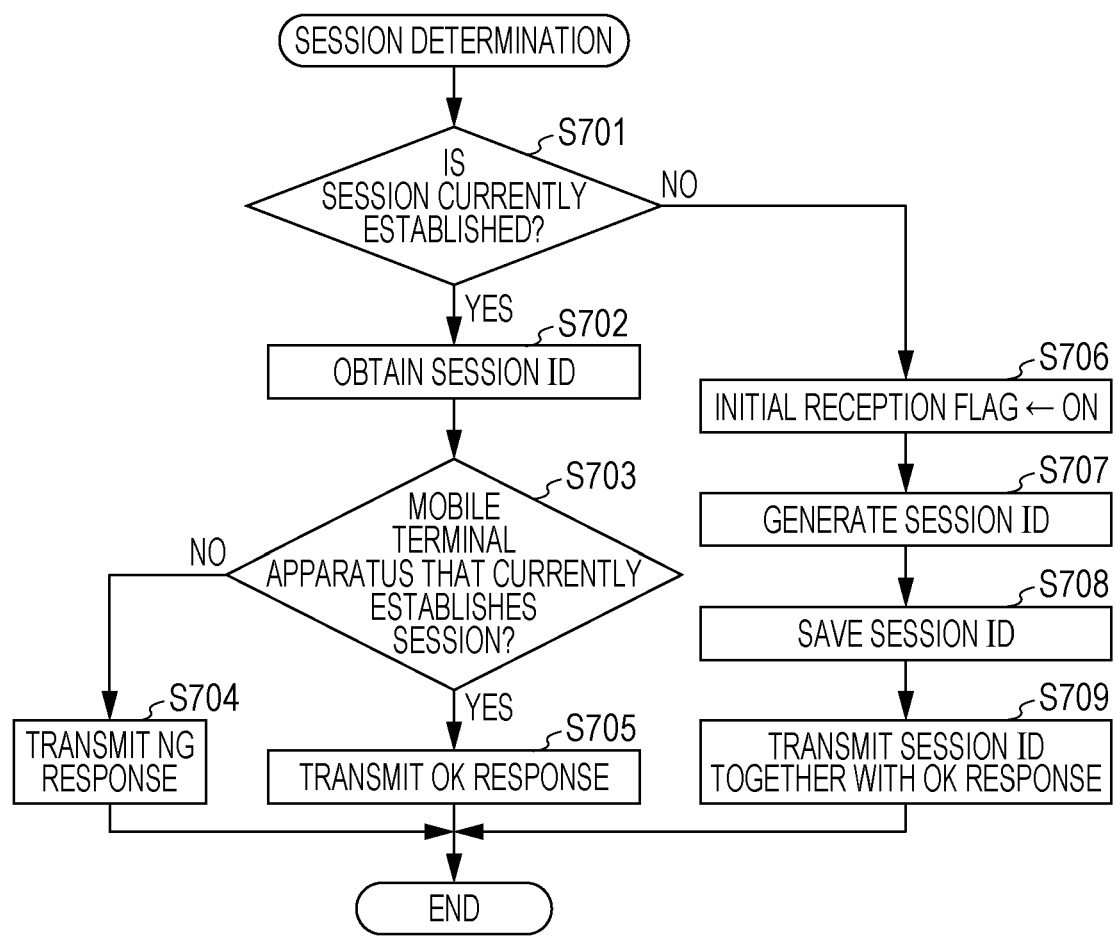
FIG. 7 is a flow chart illustrating an example of session determination processing.

FIG. 7 is a flow chart illustrating detailed processing in the session determination processing (S606). In S701, the CPU 111 checks whether or not the MFP 101 is in a state in which the session with the mobile terminal apparatus 102 is currently established. Specifically, in a case where the session ID is stored in the RAM 113, the CPU 111 determines the state in which the session is currently established. In a case where the session is currently established (S701: YES), the CPU 111 advances the processing to S702. In a case where the session is not currently established (S701: NO), the CPU 111 advances the processing to S706. In S702, the CPU 111 obtains the session ID related to the received connection request. The session ID is generated by the MFP 101 at the time of the initial connection request and transmitted to the mobile terminal apparatus 102 together with a connection response.

Next, in S703, the CPU 111 checks whether or not a transmission source of the connection request is the mobile terminal apparatus 102 that currently establishes the session. In a case where the session ID obtained in S702 and the session ID saved in the RAM 113 in S708 which will be described below are matched with each other, the CPU 111 determines that the transmission source of the connection request is the mobile terminal apparatus 102 that currently establishes the session. In a case where the transmission source of the connection request is the mobile terminal apparatus 102 that currently establishes the session (S703: YES), the CPU 111 advances the processing to S705. In a case where the transmission source of the connection request is not the mobile terminal apparatus 102 that currently establishes the session (S703: NO), the CPU 111 advances the processing to S704. In S704, the CPU 111 transmits an NG response indicating that the connection is rejected to the mobile terminal apparatus 102 as the response corresponding to the connection request. On the other hand, in S705, the CPU 111 transmits an OK response indicating that the connection is permitted to the mobile terminal apparatus 102 as the response corresponding to the connection request.

In S706, the CPU 111 sets an initial reception flag provided at a specific address of the RAM 113 as ON. Next, in S707, the CPU 111 generates the session ID. The session ID is a unique ID for identifying the mobile terminal apparatus 102. Next, in S708, the CPU 111 saves the session ID generated in S707 in an area for saving the session ID at the specific address of the RAM 113. Next, in S709, the CPU 111 transmits the OK response to the mobile terminal apparatus 102 together with the session ID. As described above, the MFP 101 transmits the saved session ID to the mobile terminal apparatus 102 together with the response with respect to the connection request. When the session ID is received, the mobile terminal apparatus 102 transmits the next request command by using this session ID.

Figure 8:
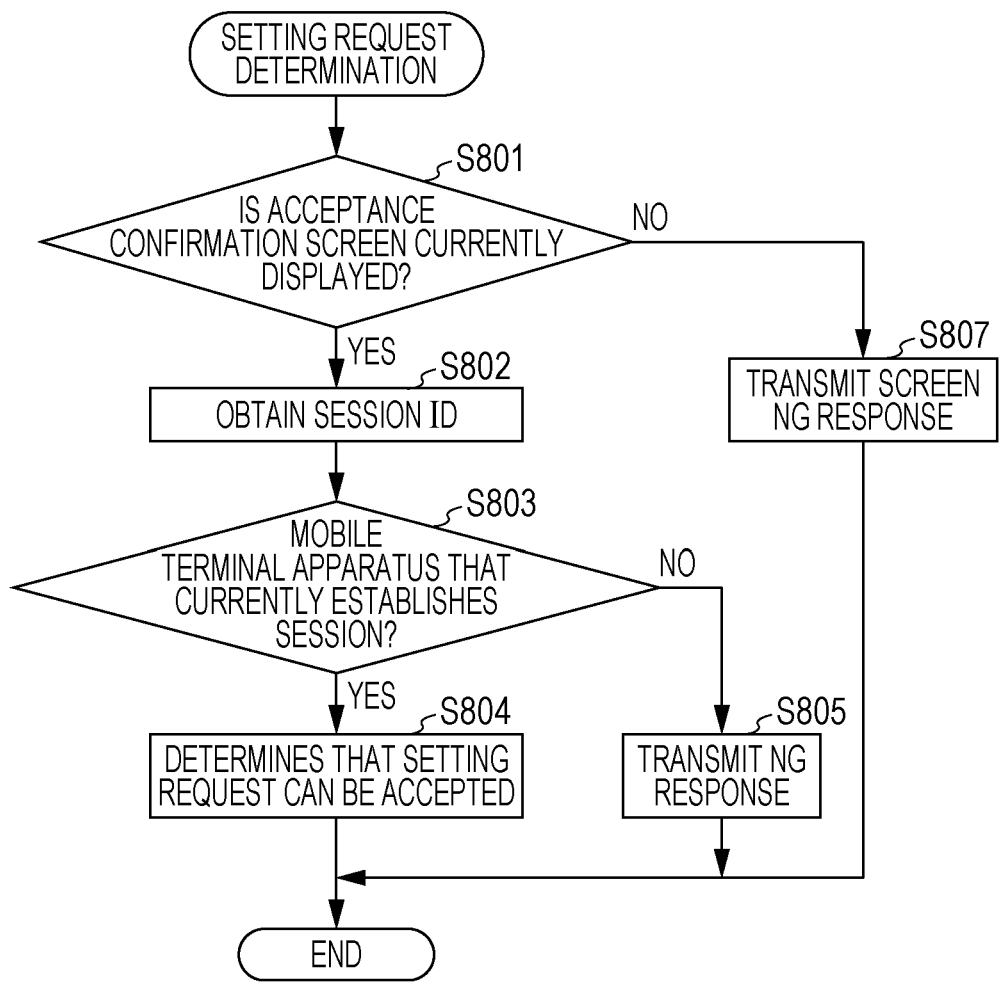
FIG. 8 is a flow chart illustrating an example of setting request determination processing.

With reference to FIG. 6A again, in S608, the CPU 111 determines whether or not the received setting request can be accepted. FIG. 8 is a flow chart illustrating detailed processing of setting request determination processing (S608). In S801, the CPU 111 checks whether or not the display screen currently displayed on the touch panel 301 is the reception acceptable screen described with reference to FIGS. 5A to 5C. In a case where the display screen is the reception acceptable screen (S801: YES), the CPU 111 advances the processing to S802. In a case where the display screen is not the reception acceptable screen (S801: NO), the CPU 111 advances the processing to S805.

In S802, the CPU 111 obtains the session ID from the received setting request and saves the session ID received from the mobile terminal apparatus 102 in the RAM 113. Next, in S803, the CPU 111 compares the session ID saved in S802 with the session ID saved in S708 and checks whether or not the transmission source of the setting request is the mobile terminal apparatus 102 that currently establishes the session. In a case where the transmission source of the setting request is the mobile terminal apparatus 102 that currently establishes the session (S803: YES), the CPU 111 advances the processing to S804. In a case where the transmission source of the setting request is not the mobile terminal apparatus 102 that currently establishes the session (S803: NO), the CPU 111 advances the processing to S805.

In S804, the CPU 111 determines that the setting request received from the mobile terminal apparatus 102 can be accepted. In S805, the CPU 111 determines that the setting request received from the mobile terminal apparatus 102 is not accepted. Subsequently, the CPU 111 transmits the NG response indicating that the setting request is rejected to the mobile terminal apparatus 102 corresponding to the transmission source of the setting request as a response with respect to the setting request. In S807, the CPU 111 also determines that the setting request received from the mobile terminal apparatus 102 is not accepted. Subsequently, the CPU 111 transmits the NG response indicating that a screen where the setting request is not accepted is currently displayed to the mobile terminal apparatus 102. As described above, in a case where the reception acceptable screen is not displayed, the MFP 101 controls so as not to permit the setting in accordance with the setting request from the mobile terminal apparatus 102 other than the mobile terminal apparatus 102 that currently establishes the session.

With reference to FIG. 6A again, in S609, in a case where the CPU 111 determines that the setting request can be accepted (S609: YES), the CPU 111 advances the processing to S610. On the other hand, in a case where the CPU 111 determines that the setting request is not accepted (S609: NO), the CPU 111 returns the processing to S601. In S610, the CPU 111 determines whether or not the received setting information can be set. Specifically, in a case where the setting information is the e-mail address, the CPU 111 determines whether or not the number of destinations exceeds the maximum number of destinations where the MFP 101 can perform the transmission and whether or not a character string length is within a settable range, for example. In addition, in a case where the setting information is the setting of the title of the e-mail and the body text, the CPU 111 determines whether or not the data is a normal character string data and whether or not the character string length does not exceed the maximum character string length, for example.

In S611, the CPU 111 checks whether or not the setting information can be set as the e-mail transmission setting on the basis of a determination result in S610. In a case where the setting information can be set (S611: YES), the CPU 111 advances the processing to S613. In a case where the setting information is not set (S611: NO), the CPU 111 advances the processing to S612. In S612, the CPU 111 transmits the NG response indicating that the setting request is rejected to the mobile terminal apparatus 102 as a response with respect to the setting request to the mobile terminal apparatus 102. As a result, since the mobile terminal apparatus 102 receives the NG response, it is possible to check that the setting is not performed in the mobile terminal apparatus 102. After the processing of S612, the CPU 111 advances the processing to S601.

In S613, the CPU 111 performs the display of the pop-up screen 402. In S614, the CPU 111 accepts an instruction in accordance with the user input. When the user presses the OK button 403, the CPU 111 accepts the OK instruction indicating that the setting in accordance with the setting information is performed. In a case where the user presses the cancel button 404, the CPU 111 accepts the cancel instruction indicating that the setting in accordance with the setting instruction is not performed. In a case where the OK instruction is accepted (OK instruction in S614), the CPU 111 advances the processing to S615. In a case where the cancel instruction is accepted (cancel instruction in S614), the CPU 111 advances the processing to S619.

In S615, the CPU 111 performs the setting related to the transmission of the image or the like on the basis of the received setting information. Next, in S616, the CPU 111 displays the e-mail transmission screen 405 on which the setting in S615 is reflected. Next, in a case where the initial reception flag set in S706 (FIG. 7) is ON, the CPU 111 sets this flag as OFF in S617. Next, in S618, the CPU 111 transmits the OK response indicating that the setting in accordance with the setting request is normally completed to the mobile terminal apparatus 102. After the processing of S618, the CPU 111 advances the processing to S601.

In S619, the CPU 111 closes the pop-up screen 402 and displays the screen that has been displayed before the display of the pop-up screen 402. Next, in S620, the CPU 111 transmits the NG response to the mobile terminal apparatus 102 as a response corresponding to the setting request. Next, in S621, the CPU 111 generates and saves a temporary session ID to establish a state in which the MFP 101 currently establishes the session so that data is not received from the other mobile terminal apparatus. A state immediately after the user performs the cancel instruction with respect to the pop-up screen 402 displayed in step S613 becomes a state in which the setting information can be accepted. However, when the setting information is accepted from a mobile terminal apparatus other than the mobile terminal apparatus 102 immediately after the cancel instruction is accepted, the pop-up screen is displayed again immediately after the cancel instruction is performed, which bothers the user who has performed the cancel instruction. In view of the above, a session virtually exists by storing the temporary session ID in the RAM 113 after the cancellation is instructed with respect to the pop-up screen 402 displayed in step S613, and the connection from the other mobile terminal apparatus is not accepted. It should be noted that the CPU 111 releases the temporary session ID at a timing when the transmission setting of the e-mail transmission screen 405 is cleared. The transmission setting in a case where a previously set condition is satisfied. The previously set condition includes a case where any of the reset button 409, the black-and-white start button 410, the color start button 411, the ES button 308, and the home button 307 is pressed, a case where a certain period of time elapses, or the like. Since the temporary session ID is released, the connection from the other mobile terminal can be accepted.

As described above, in a case where the setting request is received from the mobile terminal apparatus 102, the MFP 101 according to the first exemplary embodiment displays the pop-up screen 402, and the OK button 403 and the cancel button 404 can be selected. As a result, the data received by the MFP 101 can be easily cancelled by the user of the MFP 101. After the cancellation too, the transition of the state is performed to the temporary session established state in S621 so that the pop-up display at the time of the reception of the setting information does not disturb. As a result, it is possible to suppress the pop-up display in a case where the data is received from the mobile terminal apparatus 102 following the cancellation.

Figure 9:
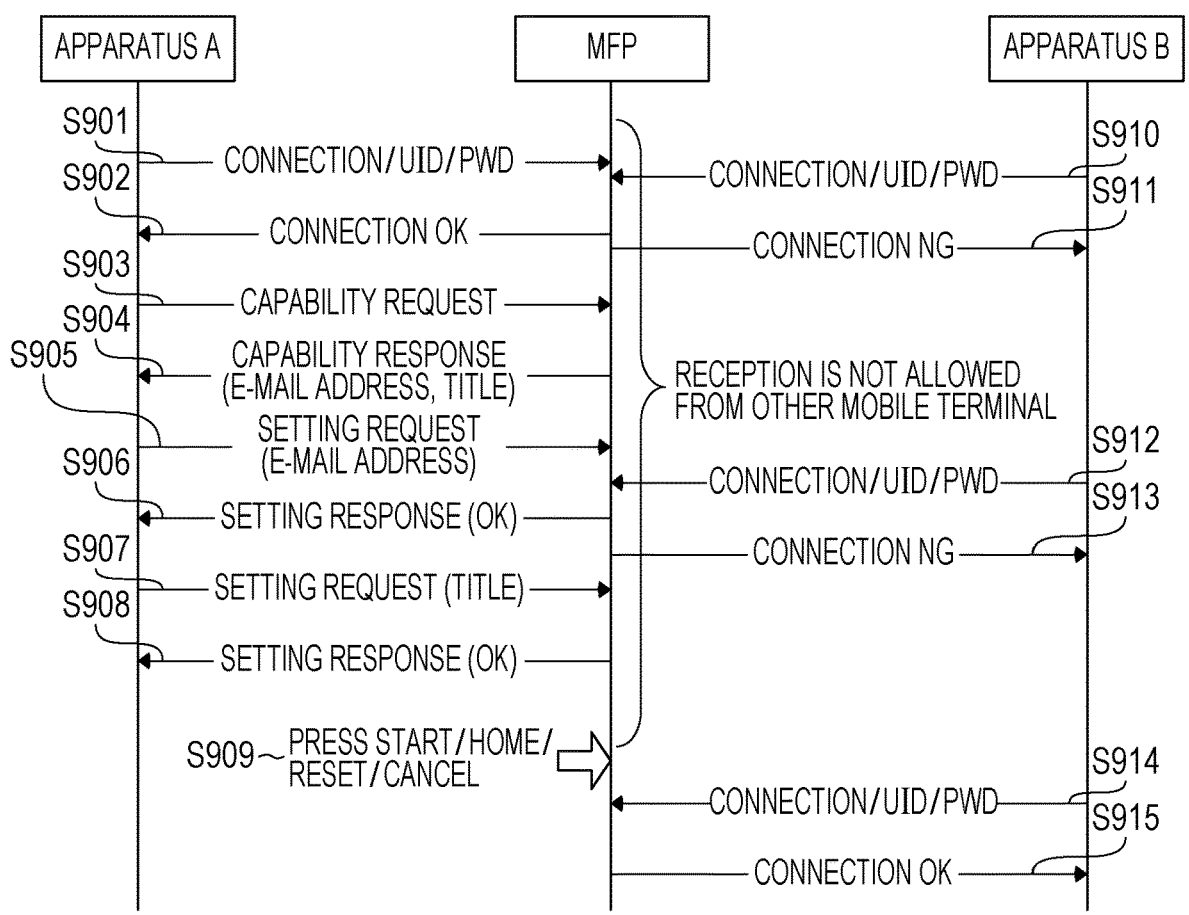
FIG. 9 is a sequence diagram illustrating an example of processing executed by the MFP and a mobile terminal apparatus.

FIG. 9 is a sequence diagram illustrating the processing of the MFP 101 and the mobile terminal apparatus 102 in a case where the information is transmitted to the MFP 101 from the two mobile terminal apparatuses 102. In FIG. 9, the two mobile terminal apparatuses 102 are set as an apparatus A and an apparatus B. In S901, the apparatus A transmits the connection request to the MFP 101 together with a user ID and a password PWD. Next, in S902, the MFP 101 transmits the OK response to the apparatus A as the connection response to the apparatus A. Herein, the MFP 101 generates the session ID and also transmits the session ID to the apparatus A together with the OK response. Next, in S903, the apparatus A transmits the capability request to the MFP 101. Next, in S904, the MFP 101 transmits the capability response including information indicating that the e-mail address and the title can be set to the apparatus A.

Next, in S905, the apparatus A transmits the setting request for setting the e-mail address as the destination to the MFP 101. In S906, the MFP 101 transmits the OK response including information indicating that the received e-mail address is normally set as the destination of the e-mail transmission with respect to the received setting request to the apparatus A. In S907, the apparatus A transmits the setting request for setting the title in the e-mail of the e-mail transmission to the MFP 101. In S908, the MFP 101 transmits the OK response including information indicating that the title is normally set with respect to the received setting request to the apparatus A.

The MFP 101 executes the processing in S905 to S908 until the press of the start/home/reset button or the cancel button 404 on the pop-up screen 402 or the elapse of the certain period of time is detected in S909. In S909, when the press of the start/home/reset button or the cancel button 404 on the pop-up screen 402 or the elapse of the certain period of time is detected, the MFP 101 clears the received setting information and resets the communication with the apparatus A.

In S910, the apparatus B transmits the connection request to the MFP 101 at a timing after the transmission timing of the connection request by the apparatus A. Since the timing is after the transmission timing of the connection request by the apparatus A, in S911, the MFP 101 transmits the NG response to the apparatus B as the connection response. At a timing of S912, even the apparatus B transmits the connection request again, the NG response is similarly received in S913. On the other hand, in a case where the connection request is transmitted at a timing of S914, since this timing is a timing after the processing of in S909, the OK response is received in S915. In this manner, the MFP 101 controls such that the connection request from an apparatus other than the apparatus A is not accepted during a period in S901 to S909. As described above, the MFP 101 according to the present exemplary embodiment sequentially processes the setting requests from the two mobile terminal apparatuses 102 instead of processing the setting requests at the same time.

As described above, the MFP 101 in the image processing system 100 according to the first exemplary embodiment displays the pop-up screen 402 to display the OK button 403 and the cancel button 404. Subsequently, the MFP 101 controls whether or not the setting is performed in accordance with the selection on which button is selected by the user. As a result, the user who currently operates the MFP 101 can avoid a situation where an unintended setting is performed. In addition, after the MFP 101 accepts the cancel instruction, the MFP 101 controls so as not to permit the setting of the setting information without displaying the pop-up screen 402 until a state in which the previously set condition is satisfied is established. As a result, the user of the MFP 101 can avoid a situation where the interruption of the operation due to the pop-up screen 402 is repeated. In this manner, it is possible to improve the usability for the user in a case where the setting information is received from the terminal apparatus.

The image processing system 100 according to the further exemplary embodiment will be described. In addition to the control according to the first exemplary embodiment, the MFP 101 according to the further exemplary embodiment does not discard the set setting information received in the last time in a case where plural pieces of setting information are sequentially received when the cancel button 404 is pressed on the pop-up screen 402.

FIG. 10 is a screen transition view of the touch panel 301 when the data of the transmission destination of the e-mail as the setting information is received from the mobile terminal apparatus 102. An e-mail transmission screen 1001 is the same screen as the e-mail transmission screen 405 illustrated in FIG. 4. The e-mail transmission screen 1001 is a screen displayed after one piece of setting information is received. When the setting information is subsequently received from the mobile terminal apparatus 102 in this state, the CPU 111 controls so as to display a pop-up screen 1002. Only an OK button 1003 is displayed on the pop-up screen 1002, and a cancel button is not displayed. As a result, it is possible to avoid a situation where the already received setting information is cancelled. When the OK button 1003 is pressed, it is displayed on the address check 1004 of the e-mail transmission screen 1001 that the second destination is added. When the address check 1004 is pressed, the CPU 111 displays a destination 1005 of an address check 1006 "Cc:". As a result, the user can check that Cc has been added.

Figure 11A:
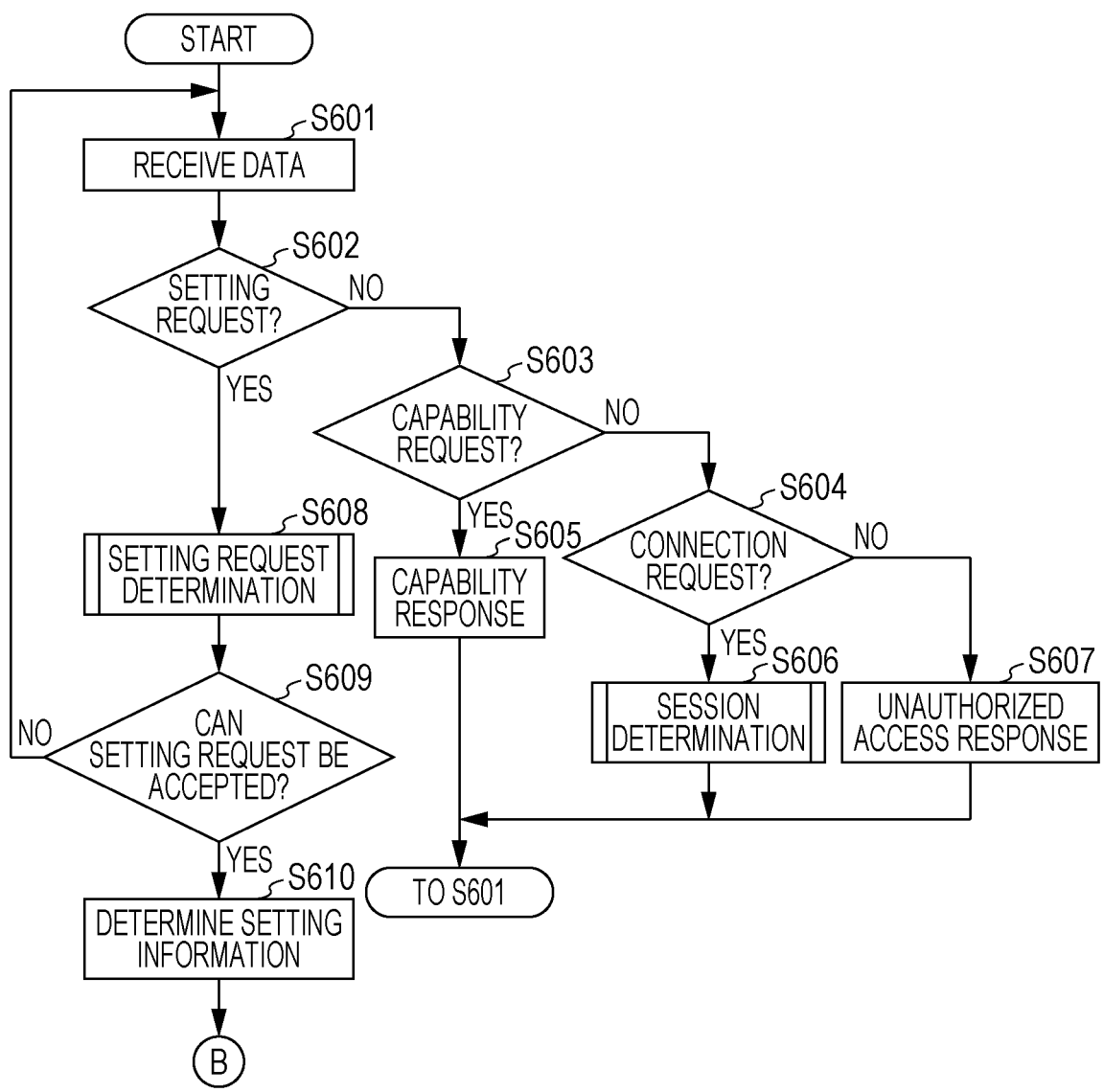
FIGS. 11A and 11B are flow charts illustrating an example of processing executed by the MFP.
Figure 11B:
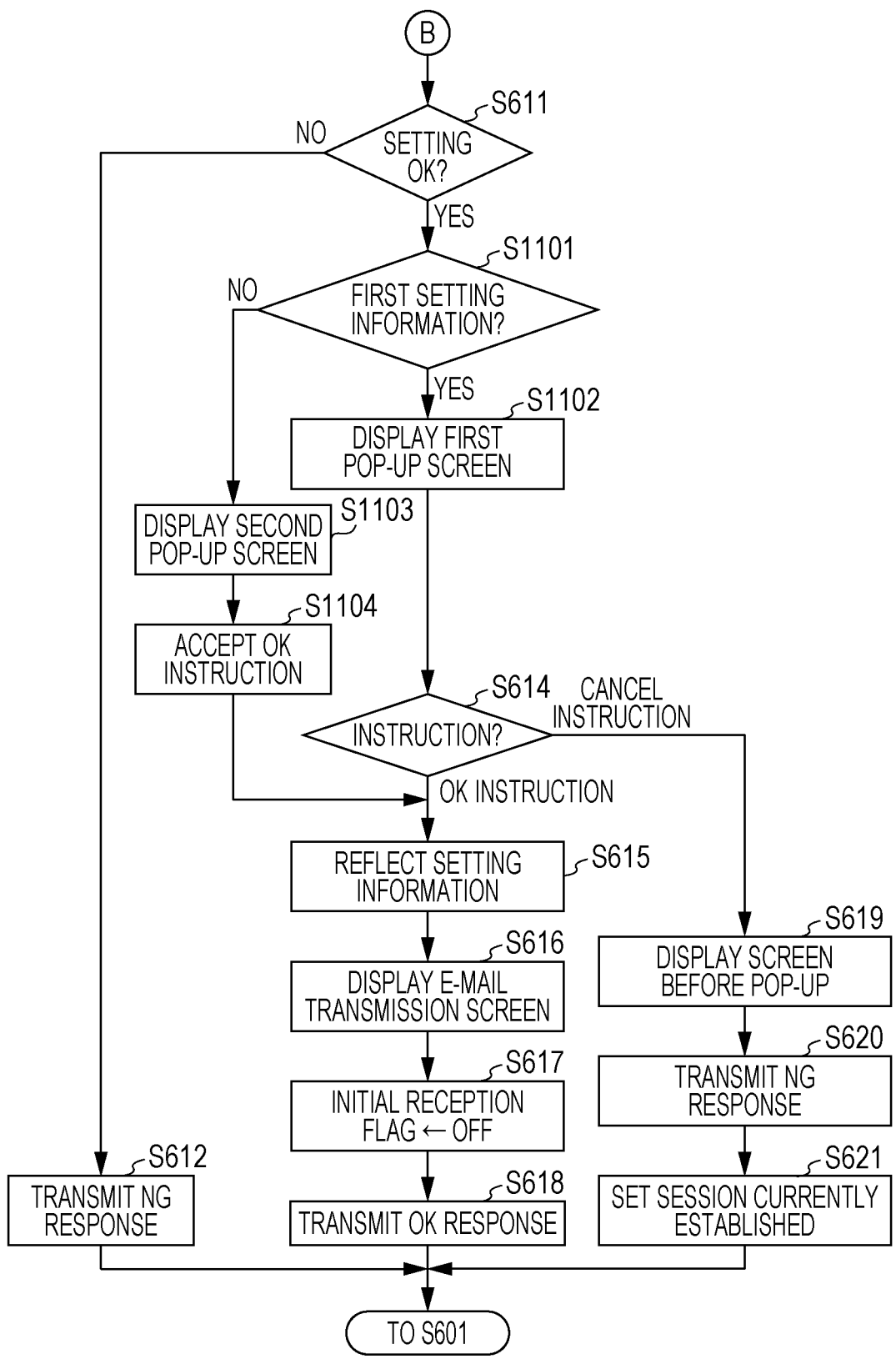

FIGS. 11A and 11B are flow charts illustrating the processing executed by the MFP 101 according to a further exemplary embodiment. It should be noted that the same number is assigned to the same processing as the processing illustrated in FIGS. 6A and 6B, and the descriptions thereof will be omitted. In S611, in a case where the setting information can be set as the e-mail transmission setting (S611: YES), the CPU 111 advances the processing to S1101. In S1101, the CPU 111 checks whether or not the information received in S601 is the first setting information. In a case where the initial reception flag is ON, the CPU 111 determines that the information is the first setting information. In a case where the initial reception flag is OFF, the CPU 111 determines that the information is not the first setting information. In a case where the information is the first setting information (S1101: YES), the CPU 111 advances the processing to S1102. In a case where the information is not the first setting information (S1101: NO), the CPU 111 advances the processing to S1103.

In S1102, the CPU 111 displays a first pop-up screen. Herein, the first pop-up screen is the same screen as the pop-up screen 402 described according to the first exemplary embodiment. The CPU 111 thereafter advances the processing to S614. On the other hand, in S1103, the CPU 111 displays a second pop-up screen. Herein, the second pop-up screen is the pop-up screen 1002 described with reference to FIG. 10. Next, in S1104, the CPU 111 accepts the OK instruction indicating that the setting in accordance with the setting information is performed in accordance with the press of the OK button 1003 on the pop-up screen 1002. The CPU 111 thereafter advances the processing to S615. It should be noted that other configurations and processings of the image processing system 100 according to the further exemplary embodiment are similar to the configurations and processings of the image processing system 100 according to the first exemplary embodiment.

As described above, according to the further exemplary embodiment, the cancel button is not displayed on the pop-up screen that is displayed when the setting information is received in the second and subsequent times, so that the already received setting information is not cancelled. As a result, when the cancel instruction is issued with respect to the setting information received in the second and subsequent times, it is possible to avoid the situation where the initial setting information is also cancelled despite the intention of the user. It should be noted that there is a possibility that the users who use the mobile terminal apparatus 102 and the MFP 101 may be different from each other in the first time, but it is conceivable that the same user operates the MFP 101 in the second and subsequent times since the OK button 403 is pressed at the time of the reception of the initial setting information. In view of the above, in a case where the same setting information is received from the mobile terminal apparatus 102, it is possible to perform the user-friendly screen display in the second and subsequent times without the display of the cancel button.

Lastly, the image processing system 100 according to a final exemplary embodiment will be described. In addition to the control according to the further exemplary embodiment, it is possible to switch whether or not the pop-up display is performed in accordance with a setting by the user in the MFP 101 according to the final exemplary embodiment. The image processing system 100 according to the final exemplary embodiment is preferably used in a case where only a single user transmits the setting information from the mobile terminal apparatus 102.

Figure 12:
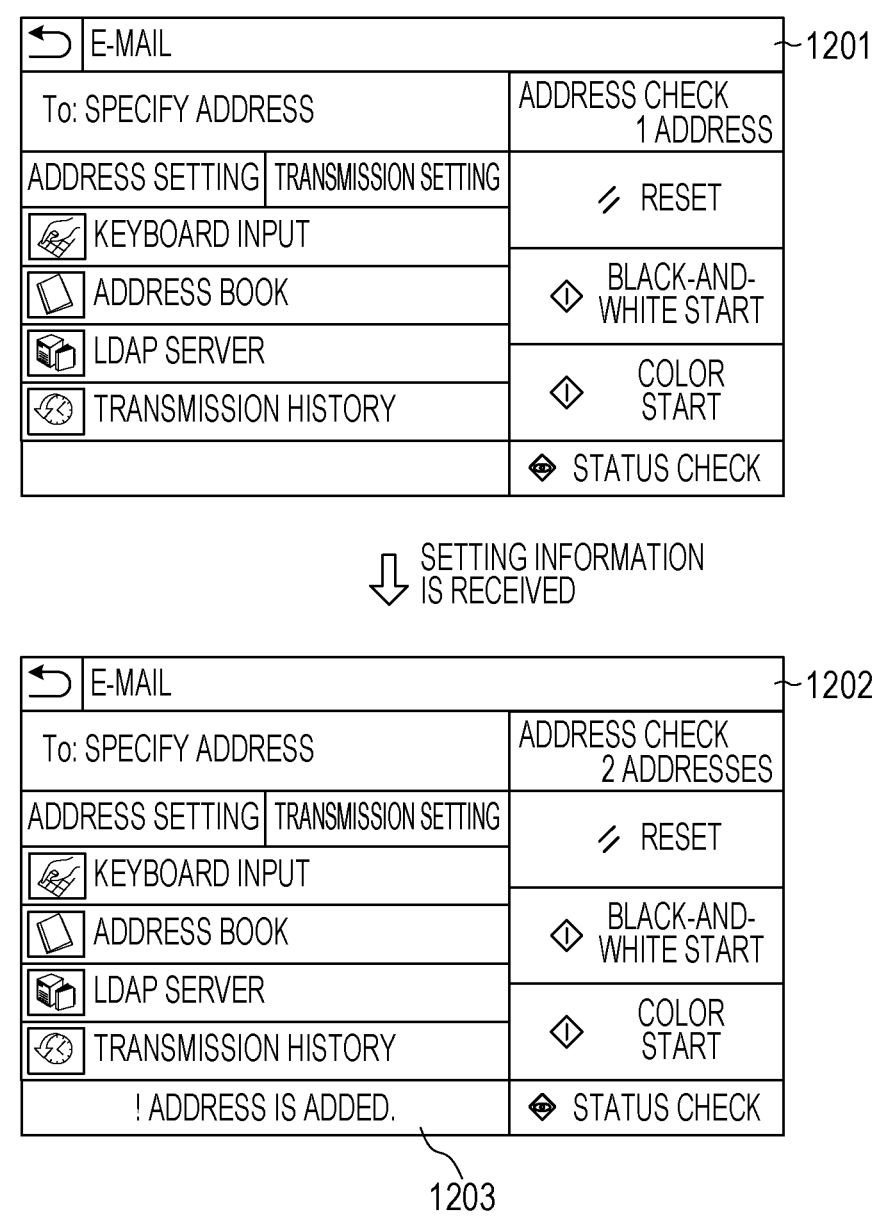

FIG. 12 is a screen transition view of the touch panel 301 when the data of the transmission destination of the e-mail is received from the mobile terminal apparatus 102 as the setting information according to the final exemplary embodiment. FIG. 12 illustrates an e-mail transmission screen 1201. When the CPU 111 receives the e-mail address as the destination from the mobile terminal apparatus 102, the number of addresses on the address check 1202 on the e-mail transmission screen 1201 is increased by one, and further, it is displayed on a status 1203 that the destination is added. Since the transition of the screen is performed in this manner, the usability for the user is improved by eliminating the control on the setting based on the pop-up display. While the pop-up display is a reminder display for the user to check the destination, an inconvenience also occurs that the user does not perform the other operations until the pop-up display is closed. In view of the above, whether or not the pop-up display is performed can be switched in accordance with the setting by the user in the MFP 101 according to the final exemplary embodiment.

Figure 13A:
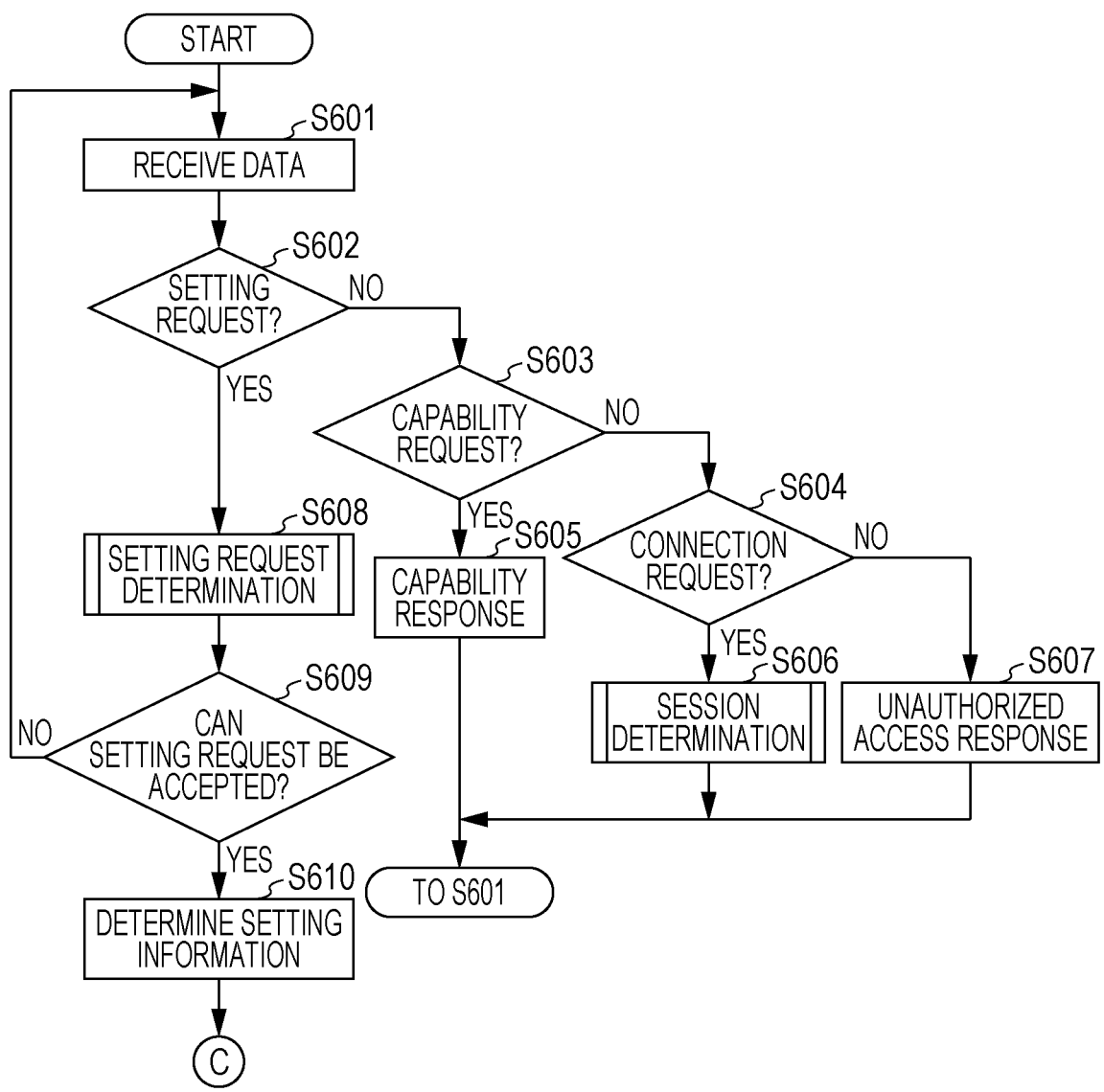
FIGS. 13A and 13B are flow charts illustrating an example of processing executed by the MFP.
Figure 13B:
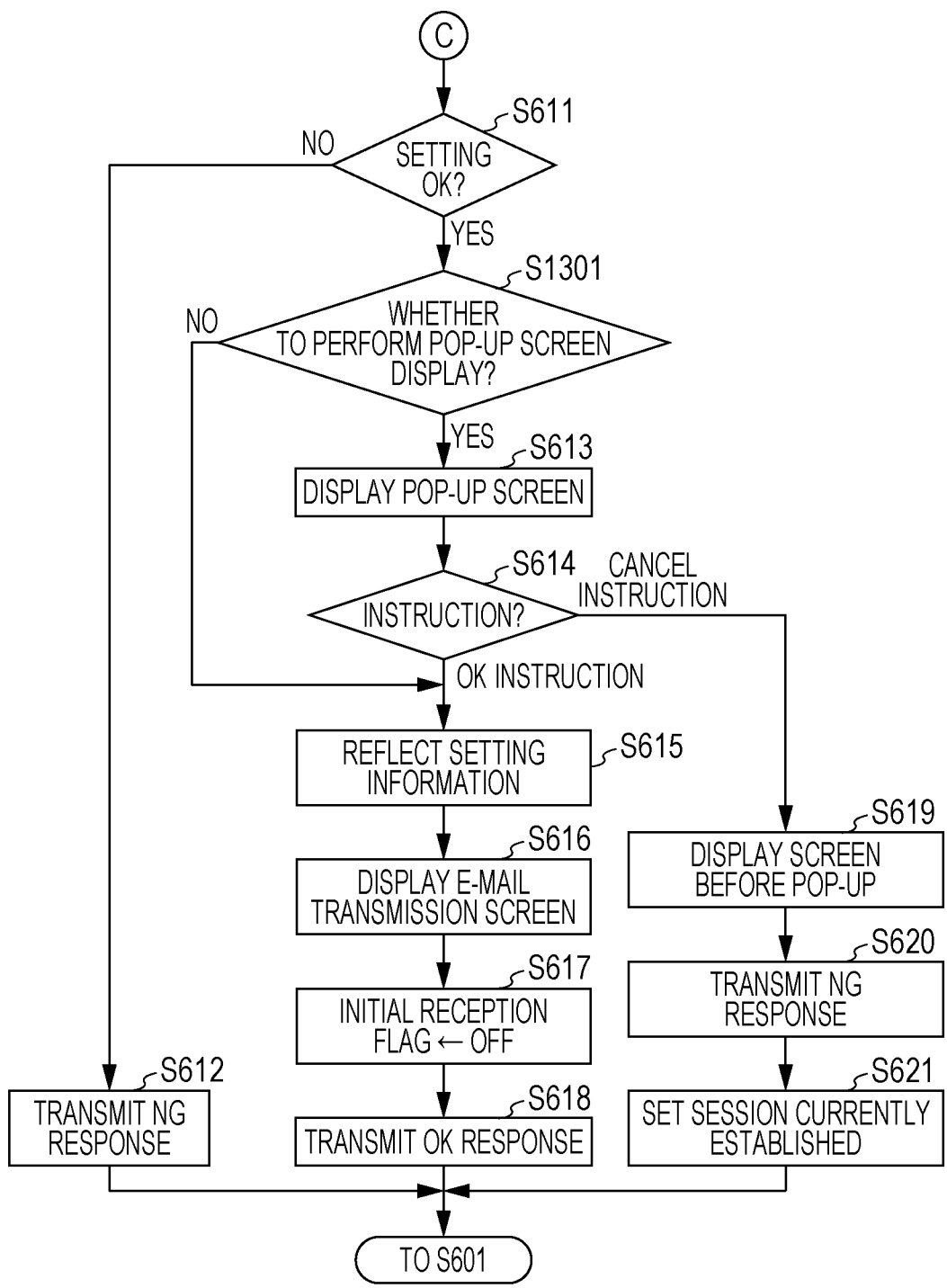

FIGS. 13A and 13B are flow charts illustrating the processing executed by the MFP 101 according to the final exemplary embodiment. The same number is assigned to the same processing as the processing illustrated in FIGS. 6A and 6B, and the descriptions thereof will be omitted. In S611, in a case where the setting information can be set as the e-mail transmission setting (S611: YES), the CPU 111 advances the processing to S1301. In S1301, the CPU 111 checks whether or not the display of the pop-up screen is performed. It should be noted that whether or not the display of the pop-up screen is set in the MFP 101 in accordance with a user operation at a timing before the time of the processing in S1301.

In a case where the display is performed (S1301: YES), the CPU 111 advances the processing to S613. In a case where the display is not performed (S1301: NO), the CPU 111 advances the processing to S615. It should be noted that the other configurations and processings of the image processing system 100 according to the present exemplary embodiment are similar to the configurations and processings of the image processing system 100 according to the other exemplary embodiments. It should be noted that, according to the present exemplary embodiment, the CPU 111 may display the status 1203 in S615 as described with reference to FIG. 12.

As described above, whether or not the pop-up screen is displayed can be controlled by the setting in accordance with the user operation in the image processing system 100 according to the final exemplary embodiment. Therefore, in a case where only the single user uses the MFP 101, it is possible to improve the usability for the user without performing the wasteful screen display.

According to the above-described exemplary embodiments, it is possible to improve the usability for the user in a case where the setting information is received from the terminal apparatus.

The exemplary embodiments of the present disclosure have been described in detail above, but the present invention is not limited to the above-described specific exemplary embodiments, and various modifications and alterations can be made within the scope of the gist of the present invention described in the claims.

Other Embodiments

Embodiments of the present disclosure can also be realized by a computer of a system or apparatus that reads out and executes computer executable instructions recorded on a storage medium (e.g., non-transitory computer-readable storage medium) to perform the functions of one or more of the above-described embodiment(s) of the present disclosure, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-179533 filed Sep. 14, 2016, which is hereby incorporated by reference herein in its entirety.

What is claimed is:

1. An image processing apparatus which receives setting information from an external apparatus, the image processing apparatus comprising:
   a wireless network interface; and
   a controller,
   wherein it is set whether the image processing apparatus displays, in accordance with reception of the setting information from the external apparatus via the wireless network interface, a confirmation screen regarding a transmission function of the image processing apparatus,
   wherein, after receiving the setting information from the external apparatus via the wireless network interface, the image processing apparatus displays the confirmation screen without an acceptance of a user operation if it is set that the image processing apparatus displays the confirmation screen in accordance with reception of the setting information from the external apparatus via the wireless network interface,
   wherein the controller sets, in accordance with reception of the setting information from the external apparatus via the wireless network interface, the received setting information without the confirmation screen being displayed by the image processing apparatus if it is not set that the confirmation screen is displayed by the image processing apparatus in accordance with reception of the setting information from the external apparatus via the wireless network interface, and
   wherein the controller performs, based on the received setting information, a transmission process for transmitting image data without the received setting information being specified by a user.

2. The image processing apparatus according to claim 1, wherein the controller sets the received setting information in accordance with an acceptance of a user operation for setting, by the controller, the received setting information via the confirmation screen that is displayed by the image processing apparatus.

3. The image processing apparatus according to claim 1, wherein the received setting information includes one or more of a file name, a body text and a title.

4. The image processing apparatus according to claim 3, wherein the received setting information includes at least information indicating a destination.

5. The image processing apparatus according to claim 4, wherein the controller adds, to a transmission destination, the information indicating the destination included in the received setting information, and
   wherein, if other setting content is included in the received setting information different from the destination, the controller sets the received setting information by overwriting a preset setting information.

6. The image processing apparatus according to claim 1, wherein the controller performs a transmission process for transmitting information indicating a success of a setting of the setting information to the external apparatus in accordance with a completion of the setting of the setting information.

7. The image processing apparatus according to claim 1, wherein the controller does not set the received setting information in accordance with acceptance of a user operation for cancelling the received setting information via the confirmation screen that is displayed by the image processing apparatus.

8. The image processing apparatus according to claim 1, wherein the controller performs a transmission process for transmitting information in accordance with the acceptance of the user operation for cancelling the setting information via the confirmation screen that is displayed by the image processing apparatus.

9. The image processing apparatus according to claim 1, wherein the wireless network interface receives the setting information by direct wireless communication.

10. The image processing apparatus according to claim 1, wherein the image processing apparatus displays a transmission screen on which the setting information is set in a case where the controller sets the received setting information.

11. The image processing apparatus according to claim 1, further comprising
    an operation device,
    wherein the confirmation screen is a screen for receiving, by the operation device, a selection of whether to set the received setting information from the external apparatus via the wireless network interface.

12. A method for controlling an image processing apparatus which receives setting information from an external apparatus, the method comprising:
    setting whether the image processing apparatus displays, in accordance with reception of the setting information from the external apparatus via a wireless network interface, a confirmation screen regarding a transmission function of the image processing apparatus;
    displaying, after receiving the setting information from the external apparatus via the wireless network interface, the confirmation screen without an acceptance of a user operation, if it is set that the confirmation screen is displayed in accordance with reception of the setting information from the external apparatus via the wireless network interface;
    setting, in accordance with reception of the setting information from the external apparatus via the wireless network interface, the received setting information without the confirmation screen being displayed, if it is not set that the confirmation screen is displayed in accordance with reception of the setting information from the external apparatus via the wireless network interface; and performing, based on the received setting information, a transmission process for transmitting image data without the received setting information being specified by a user.

13. A non-transitory computer-readable program for causing a computer to execute a method for controlling an image processing apparatus which receives setting information from an external apparatus, the method comprising:

setting whether the image processing apparatus displays, in accordance with reception of the setting information from the external apparatus via a wireless network interface, a confirmation screen regarding a transmission function of the image processing apparatus;

displaying, after receiving the setting information from the external apparatus via the wireless network interface, the confirmation screen without an acceptance of a user operation, if it is set that the confirmation screen is displayed in accordance with reception of the setting information from the external apparatus via the wireless network interface;

setting, in accordance with reception of the setting information from the external apparatus via the wireless network interface, the received setting information without the confirmation screen being displayed, if it is not set that the confirmation screen is displayed in accordance with reception of the setting information from the external apparatus via the wireless network interface; and performing, based on the received setting information, a transmission process for transmitting image data without the received setting information being specified by a user.

* * * * *